US012503536B2

(12) United States Patent
Jeong et al.

(10) Patent No.: US 12,503,536 B2
(45) Date of Patent: Dec. 23, 2025

(54) METHOD FOR MANUFACTURING VINYL CHLORIDE-ACRYL COPOLYMER LATEX

(71) Applicant: HANWHA SOLUTIONS CORPORATION, Seoul (KR)

(72) Inventors: Eun Soo Jeong, Daejeon (KR); Geun Chang Ryu, Daejeon (KR); Chulwoong Lee, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 940 days.

(21) Appl. No.: 17/762,129

(22) PCT Filed: Jul. 17, 2020

(86) PCT No.: PCT/KR2020/009423
§ 371 (c)(1),
(2) Date: Mar. 21, 2022

(87) PCT Pub. No.: WO2021/054592
PCT Pub. Date: Mar. 25, 2021

(65) Prior Publication Data
US 2022/0348703 A1 Nov. 3, 2022

(30) Foreign Application Priority Data
Sep. 19, 2019 (KR) .................. 10-2019-0115257

(51) Int. Cl.
C08F 214/06 (2006.01)
C08F 220/14 (2006.01)
C09D 11/023 (2014.01)
C09D 11/107 (2014.01)

(52) U.S. Cl.
CPC .......... C08F 214/06 (2013.01); C09D 11/023 (2013.01); C09D 11/107 (2013.01); C08F 220/14 (2013.01); C08F 2800/20 (2013.01)

(58) Field of Classification Search
None
See application file for complete search history.

(56) References Cited

FOREIGN PATENT DOCUMENTS

| CN | 1094412 A | 11/1994 | |
|---|---|---|---|
| CN | 102977249 A | 3/2013 | |
| CN | 105814098 A | 7/2016 | |
| EP | 1798244 A1 * | 6/2007 | ............ C08F 214/06 |
| EP | 1798246 A1 | 6/2007 | |
| JP | S47-016976 B1 | 5/1972 | |
| JP | H0341103 A | 2/1991 | |

(Continued)

OTHER PUBLICATIONS

The Notice of Allowance dated Jun. 3, 2024, of the corresponding Japanese Patent Application.

Primary Examiner — Richard A. Huhn
(74) Attorney, Agent, or Firm — Harvest IP Law, LLP

(57) ABSTRACT

Provided is a method of preparing a vinyl chloride-acrylic copolymer latex.
Specifically, in one embodiment of the present invention, provided is a method of preparing a latex including vinyl chloride-acrylic copolymer particles with a high degree of polymerization and high molecular weight by performing an emulsion polymerization of a vinyl chloride monomer and an acrylic monomer in the presence of an aqueous dispersion medium and an emulsifier while optimizing a feeding mode of the monomers and the emulsifier.

14 Claims, 1 Drawing Sheet

(56) References Cited

FOREIGN PATENT DOCUMENTS

| | | |
|---|---|---|
| JP | 06166156 A | 6/1994 |
| JP | H10139801 A | 5/1998 |
| JP | 2000075550 A | 3/2000 |
| JP | 2002521507 A | 7/2002 |
| JP | 2016-188334 A | 11/2016 |
| KR | 960008126 B1 | 6/1996 |
| KR | 100259206 B1 | 6/2000 |
| KR | 100511941 B1 | 8/2005 |
| KR | 1020070030669 A | 3/2007 |
| KR | 1020080022751 A | 3/2008 |
| KR | 101056931 B1 | 8/2011 |
| KR | 101411098 B1 | 6/2014 |
| KR | 101658119 B1 | 9/2016 |

* cited by examiner

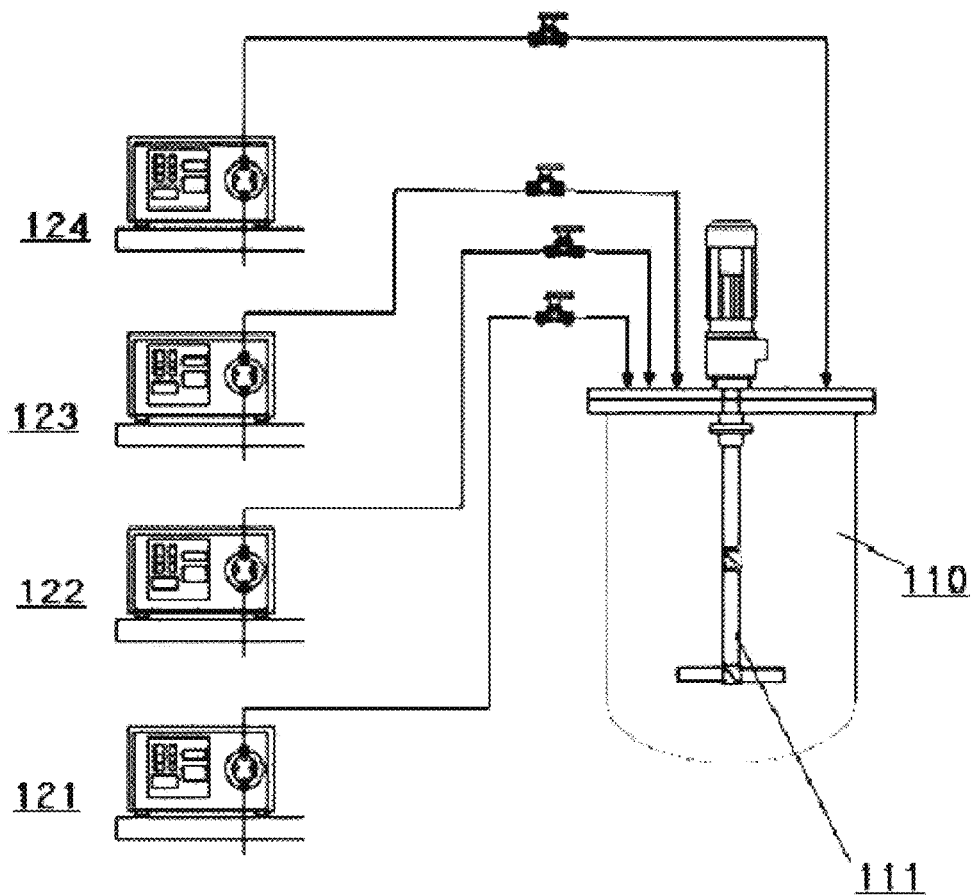

METHOD FOR MANUFACTURING VINYL CHLORIDE-ACRYL COPOLYMER LATEX

CROSS-REFERENCE TO RELATED APPLICATION(S)

This application is a National Stage of International Application No. PCT/KR2020/009423 filed Jul. 17, 2020, claiming priority based on Korean Patent Application No. 10-2019-0115257 filed on Sep. 19, 2019 with the Korean Intellectual Property Office, the disclosures of which are herein incorporated by reference in their entirety.

The present invention relates to a method of preparing a vinyl chloride-vinyl acetate copolymer latex.

BACKGROUND OF THE INVENTION

(a) Field of the Invention

(b) Description of the Related Art

A vinyl chloride-based resin is a general-purpose resin that is the most widely used in the world as a living and industrial material, and in particular, it is excellent in improving pigment dispersion and adhesion performance of inks, paints, coatings, adhesives, etc.

When the vinyl chloride-based resin is prepared, it is generally prepared as a copolymer by using a vinyl chloride monomer and a heterogeneous monomer, rather than using the vinyl chloride monomer alone as a monomer, in order to improve performances such as plasticity, fluidity, solubility, etc.

The vinyl chloride-based resin is prepared using an oily or aqueous dispersion medium, and may be obtained in the state of latex, in which vinyl chloride-based resin particles are dispersed in the dispersion medium. The resulting product is dried and pulverized to obtain the powdered vinyl chloride-based resin, or it is also possible to apply the latex as it is to products such as inks, paints, coatings, adhesives, etc.

Specifically, when the latex, in which the vinyl chloride-based resin particles are dispersed in the dispersion medium, is applied as it is to the products, processes (i.e., a drying process and a pulverizing process) for obtaining the powdered vinyl chloride-based resin are omitted, and thus there is an advantage in that the process cost is reduced.

In the fields of inks, paints, coatings, adhesives, etc., there is a trend towards replacing existing oil-based products with eco-friendly water-based products. In accordance with this trend, the latex prepared by using the aqueous dispersion medium may be also applied as it is to the water-based products.

However, when the vinyl chloride monomer and the heterogeneous monomer are polymerized in the aqueous dispersion medium, a latex including copolymer particles with a low degree of polymerization and a low molecular weight is produced, because the monomers are different from each other in terms of the reactivity. This is a challenge to be overcome in the art.

SUMMARY OF THE INVENTION

According to one embodiment of the present invention, there is provided a method of preparing a latex including vinyl chloride-acrylic copolymer particles with a high degree of polymerization and a high molecular weight and a uniform particle composition.

In one embodiment of the present invention, it is intended to solve the above problem by performing an emulsion polymerization of a vinyl chloride monomer and an acrylic monomer in the presence of an aqueous dispersion medium and an emulsifier while optimizing a feeding mode of the monomers and the emulsifier.

Specifically, in one embodiment of the present invention, a semi-continuous reaction is used, in which the acrylic monomer is continuously fed after initiating the reaction of the vinyl chloride monomer, and the vinyl chloride monomer and the emulsifier are continuously further fed, respectively.

According to one embodiment, it is possible to obtain a latex including vinyl chloride-vinyl acetate copolymer particles with a high degree of polymerization and a high molecular weight and a uniform particle composition by easily controlling the heat of reaction and reaction rate during a process of continuously feeding an acrylic monomer after initiating a polymerization reaction of a vinyl chloride monomer, and continuously further feeding the vinyl chloride monomer and an emulsifier, respectively.

As described, the latex including the vinyl chloride-vinyl acetate copolymer particles with a high degree of polymerization and a high molecular weight and a uniform particle composition may be applied to products such as inks, paints, coatings, adhesives, etc., thereby contributing to the improvement of mechanical strength of the products.

Further, since an aqueous dispersion medium is used in one embodiment, it is possible to apply, to water-based products, the final product in the latex state as it is without a separate treatment, thereby contributing to the development of eco-friendly products.

BRIEF DESCRIPTION OF THE DRAWINGS

FIGURE illustrates a reactor applicable in one embodiment of the present invention.

DETAILED DESCRIPTION OF THE EMBODIMENTS

The present invention may be variously modified and have various forms, and specific embodiments will be illustrated and described in detail. It should be understood, however, that the description is not intended to limit the present invention to the particular forms disclosed, but on the contrary, the intention is to cover all modifications, equivalents, and alternatives falling within the spirit and scope of the invention. When it is determined that the detailed description of the known art related to the present invention may obscure the gist of the present invention, the detailed description will be omitted herein. Further, although the terms including ordinal numbers such as first, second, etc. may be used herein to describe various elements, these elements should not be limited by these terms. These terms are only used to distinguish one element from another. For example, a first element could be termed a second element, and similarly, a second element could be termed a first element, without departing from the scope of the present invention.

The singular forms are intended to include the plural forms as well, unless the context clearly indicates otherwise. It will be further understood that the terms "including" or "having", when used herein, specify the presence of stated features, integers, steps, operations, elements, components, or combination thereof, but do not preclude the presence or addition of one or more other features, integers, steps, operations, elements, components, or combination thereof.

Hereinafter, one embodiment of the present invention will be described in detail with reference to drawings.

Method of Preparing Vinyl Chloride-Vinyl Acetate Copolymer Latex

In one embodiment of the present invention, provided is a method of preparing a vinyl chloride-acrylic copolymer latex, the method including the steps of preparing a polymerization reaction by feeding an aqueous dispersion medium, an emulsifier, and a vinyl chloride monomer to a reactor; initiating the polymerization reaction by continuously feeding an initiator to the prepared reactor; and continuously feeding an acrylic monomer to the reactor, in which the polymerization reaction is initiated.

In one embodiment, in the step of continuously feeding the acrylic monomer to the reactor, in which the polymerization reaction is initiated, the vinyl chloride monomer and the emulsifier are also continuously further fed, respectively.

In the preparation of a latex, monomers may be generally fed in a batch, semi-continuous, or continuous feeding mode.

Here, the batch mode is a mode in which raw materials are added once, and the reaction is continued until the purpose is achieved. The continuous mode is a mode in which raw materials are continuously fed. The semi-continuous mode is a mode in which raw materials are first fed, and others are fed as the reaction proceeds. The decision as to which of these methods to use may be based on various factors such as properties of the latex preparation reaction, production volume, etc.

In detail, when a latex is prepared using a vinyl chloride monomer, it is necessary to consider that a polymer with a low degree of polymerization and a low molecular weight tends to be produced, as the temperature of the polymerization reaction is higher.

In this regard, the batch mode, in which raw materials are added once, and the reaction is continued until the purpose is achieved, may be inappropriate in that it is difficult to control the reaction rate and the heat of polymerization generated during the polymerization reaction using the vinyl chloride monomer.

Meanwhile, the continuous mode, in which raw materials are continuously fed during reaction, may suppress the heat of polymerization, as compared to the batch mode, but there is still a disadvantage in that it is difficult to control the heat of polymerization and the reaction rate as desired during the process of continuously feeding raw materials until the polymerization reaction using the vinyl chloride monomer is terminated after initiating.

In contrast, when the semi-continuous mode is used, in which only some of the raw materials is fed and reacted, and the remaining raw materials are continuously fed during the reaction, it is possible to suppress generation of excessively high heat of reaction during the polymerization reaction using the vinyl chloride monomer and to control the reaction rate.

Practically, in Experimental Example to be described later, it was confirmed that, during the preparation of the vinyl chloride-acrylic latex using the vinyl chloride monomer and the acrylic monomer, when the semi-continuous mode is used, a latex including vinyl chloride-acrylic copolymer particles with a relatively high degree of polymerization and high molecular weight and a uniform particle composition is obtained, as compared with use of the batch mode.

Such a latex including vinyl chloride-acrylic copolymer particles with a relatively high degree of polymerization and high molecular weight and a uniform particle composition may be applied to products such as inks, paints, coatings, adhesives, etc., thereby contributing to the improvement of mechanical strength thereof.

However, in Experimental Example to be described later, even though the semi-continuous mode was used to prepare a vinyl chloride-vinyl acetate copolymer latex using the vinyl chloride monomer and the vinyl acetate monomer, a latex having physical properties at the level of the batch mode was often obtained.

Such a problem occurs when the reactivities of the monomers are not considered even though the semi-continuous mode is used.

Specifically, the acrylic monomer is known to have a higher reactivity and a higher reaction rate than the vinyl chloride monomer.

Therefore, when the reaction is started while the total amount of the emulsifier, the total amount of the vinyl chloride monomer, and a part of the acrylic monomer are fed, the acrylic monomers having a relatively high reaction rate are first reacted with each other.

In this state, when the acrylic monomer is further fed, before the vinyl chloride monomer participates in the reaction, a block copolymer with a low degree of randomness is inevitably formed.

A latex including vinyl chloride-acrylic copolymer particles with such a low degree of randomness may have inferior physical properties such as dispersibility and color development, when applied to inks, paints, coatings, adhesives, etc.

In contrast, in one embodiment, the acrylic monomer having a relatively high reaction rate is fed after initiating the reaction of the vinyl chloride monomer, and the vinyl chloride monomer is further fed during the process of feeding the acrylic monomer, thereby forming a random copolymer with a high degree of randomness.

Specifically, in one embodiment, a part of the emulsifier and a part of the vinyl chloride monomer are fed, and an initiator is fed thereto to initiate the reaction between the vinyl chloride monomers.

In this state, the acrylic monomer is fed, and the vinyl chloride monomer and the emulsifier are additionally fed, respectively. As a result, a random polymerization occurs between the acrylic monomer and the vinyl chloride monomer fed after initiating the reaction of the vinyl chloride monomer.

As described, the latex including the vinyl chloride-acrylic copolymer particles having a high degree of randomness may improve physical properties such as dispersibility and color development, when applied to inks, paints, coatings, adhesives, etc.

Furthermore, in one embodiment, since an aqueous dispersion medium is used, it is possible to apply, to water-based products, the final product in the latex state as it is without a separate treatment, thereby contributing to the development of eco-friendly products.

Hereinafter, one embodiment will be described in more detail.

In one embodiment, the acrylic monomer may be an alkyl acrylate monomer, specifically, one or more monomers selected from the group consisting of 2-ethylhexyl acrylate, ethyl acrylate, n-butyl acrylate, lauryl acrylate, stearyl acrylate, and cyclohexyl acrylate, for example, 2-ethylhexyl acrylate.

In one embodiment, a weight ratio of the vinyl chloride monomer and the acrylic monomer to be reacted may be 70:30 to 90:10 (the total amount of vinyl chloride monomer: the total amount of acrylic monomer), and a copolymer latex prepared in this range may exhibit excellent performances such as plasticity, fluidity, solubility, etc. However, this is only an example, and the weight ratio of the total amount of the vinyl chloride monomer and the acrylic monomer may be adjusted according to common sense in the art.

On the other hand, in one embodiment, when the total amount of the vinyl chloride monomer fed before and after initiation of the polymerization reaction is regarded as 100% by weight, 10% by weight to 30% by weight thereof may be fed in a batch mode in the preparation step before initiation of the polymerization reaction, and the remainder may be continuously fed while increasing the feeding amount per hour after initiation of the polymerization reaction.

As described above, when the relatively small amount of the vinyl chloride monomer is fed before initiation of the polymerization reaction, and the relatively large amount thereof is additionally fed after initiation, thereby suppressing the heat of reaction generated in the initial stage of polymerization as much as possible. In addition, when additionally fed, the vinyl chloride monomer is continuously fed while increasing the feeding rate (feeding amount per hour), thereby suppressing the heat of reaction in the continued reaction and easily controlling the degree of polymerization and molecular weight of the copolymer to be produced by controlling the reaction rate.

In one embodiment, the step of preparing the polymerization reaction may be to increase the temperature until the internal temperature thereof reaches the reaction temperature in a state in which the aqueous dispersion medium, the emulsifier, and the vinyl chloride monomer are fed to the reactor.

The reaction temperature may be controlled in the range of 40° C. to 80° C., which is a temperature range that allows the vinyl chloride monomer and the acrylic monomer to react, for example, the lower limit of the reaction temperature may be 40° C., 45° C., 50° C., 55° C., or 60° C. and the upper limit thereof may be 80° C., 75° C., or 70° C.

In one embodiment, when the internal temperature of the reactor, to which the aqueous dispersion medium, the emulsifier, and the vinyl chloride monomer are fed, reaches the reaction temperature, the initiator may be fed to initiate the polymerization reaction between the vinyl chloride monomers.

In one embodiment, when the polymerization reaction between the vinyl chloride monomers has progressed to some degree, the acrylic monomer may be continuously fed to participate in the polymerization reaction. In addition, in this process, the vinyl chloride monomer and the emulsifier may also be continuously fed to participate in the polymerization reaction.

This means that, at the same time as or after initiating the feeding of the acrylic monomer, feeding of the remainder of the vinyl chloride monomer and the emulsifier may be initiated, respectively.

In this regard, it is possible to initiate the additional feeding of the vinyl chloride monomer at the same time as the feeding of the acrylic monomer.

However, it is not necessary to make the additional feeding time of the emulsifier the same as the additional feeding time of the vinyl chloride monomer. At a predetermined time after initiating the additional feeding of the vinyl chloride monomer, the additional feeding of the emulsifier may be initiated. In the latter case, as compared with the former case, it is possible to obtain a latex having a relatively narrow particle size distribution and better stability.

For example, at 40 minutes to 50 minutes after the starting point of the emulsion polymerization by the feeding of the initiator, the additional feeding of the vinyl chloride monomer may be initiated, and at 10 minutes to 20 minutes after the starting point of the additional feeding of the vinyl chloride monomer, the additional feeding of the emulsifier may be initiated.

However, this is only an example, and the starting point of the additional feeding of each material may be relatively determined depending on the total polymerization reaction time. Specifically, when the total polymerization reaction time is 300 minutes to 400 minutes, the additional feeding of the vinyl chloride monomer and the acrylic monomer may be initiated at the time point of $1/8$ or more and $1/6$ or less of the total polymerization reaction time, and the additional feeding of the emulsifier may be initiated at the time point of $1/7$ or more and $1/5$ or less of the total polymerization reaction time.

Meanwhile, when the additional feeding of the vinyl chloride monomer and the emulsifier is performed, the feeding amounts thereof per hour (i.e., feeding rate) may be each independently increased. In this case, the feeding rate becomes constant, and advantages such as easy control of the heat of reaction and shortening of the polymerization time may be taken, as compared with the additional feeding of the vinyl chloride monomer and the emulsifier.

Specifically, as the feeding rate of 2-ethylhexyl acrylate monomer fed after the initiation of the reaction is gradually decreased, and each feeding rate of the vinyl chloride monomer and the emulsifier additionally fed is gradually increased, a relatively larger amount of vinyl chloride-based repeating units may be distributed on the surface of the vinyl chloride-acrylic copolymer particles.

This may contribute to effectively controlling the heat of reaction during the reaction, reducing fouling inside the reactor after the reaction, and increasing production continuity.

More specifically, the rate of the additional feeding of the vinyl chloride monomer may be increased by three steps, and the rate of the additional feeding of the emulsifier may be increased by two steps.

For example, with regard to the vinyl chloride monomer, a first additional feeding may be performed while controlling the feeding amount per hour to 3 ml to 4 ml from the starting point of the additional feeding to a time point of $1/8$ or more and $2/9$ or less of the total polymerization reaction time; a second additional feeding may be performed while controlling the feeding amount per hour to 6 ml to 7 ml from the end point of the first additional feeding to a time point of $2/9$ or more and $3/5$ or less of the total polymerization reaction time; and a third additional feeding may be performed while controlling the feeding amount per hour to 8 ml to 9 ml from the end point of the second additional feeding to a time point of $3/5$ or more and $4/5$ or less of the total polymerization reaction time.

Further, with regard to the emulsifier, a first additional feeding may be performed while controlling the feeding amount per hour to 0.6 ml to 1.1 ml from the starting point of the additional feeding of the emulsifier to a time point of $1/7$ or more and $1/2$ or less of the total polymerization reaction time; and a second additional feeding may be performed while controlling the feeding amount per hour to 1 ml to 1.5 ml from the end point of the first additional feeding to a time point of $1/2$ or more and $9/10$ or less of the total polymerization reaction time.

As described, the effect of controlling the heat of reaction may be improved by varying the feeding rates of the vinyl chloride monomer and the emulsifier, respectively. However, each of the above numerical ranges is an example, and it is also possible to adjust the upper and lower limits within each numerical range.

With regard to the acrylic monomer, the feeding amount per hour (i.e., feeding rate) may be decreased by two steps.

For example, a first feeding may be performed while controlling the feeding amount per hour to 3 ml to 4 ml from the starting point of the feeding of the acrylic monomer to a time point of 1/8 or more and 2/5 or less of the total polymerization reaction time; and a second feeding may be performed while controlling the feeding amount per hour to 2 ml to 3 ml from the end point of the first feeding to a time point of 2/5 or more and 3/5 or less of the total polymerization reaction time.

The initiator may be continuously fed while maintaining the feeding amount per hour constant from the starting point of the polymerization reaction to the end point of the polymerization reaction, and the feeding amount thereof per hour may be maintained constant within the range of 1 ml to 2 ml. Within this range, there is an effect of allowing normal polymerization without delay of the polymerization time, but it is also possible to adjust the upper and lower limits within this range.

The end point of the polymerization reaction may be a point at which the internal pressure of the reactor is decreased by 2 $kgf/cm^2$ to 4 $kgf/cm^2$, as compared to the highest pressure of the reactor reached after the start of the reaction. However, this is an example, and it is also possible to adjust the upper and lower limits within this range.

Details other than the above description may follow those generally known in the art. Hereinafter, those known in the art will be briefly described, but the exemplary embodiments may not be limited thereto.

Non-limiting examples of the water-soluble initiator may include one or more compounds selected from the group consisting of potassium persulfate, ammonium persulfate, sodium persulfate, sodium bisulfate, and sodium hydrosulfite.

In addition, as the emulsifier, an anionic emulsifier, a non-ionic emulsifier, or a mixture thereof may be used.

As the anionic emulsifier, specifically, an alkali metal salt or ammonium salt of a fatty acid having 6 to 20 carbon atoms, an alkali metal salt or ammonium salt of an alkylsulfonic acid having 6 to 20 carbon atoms, an alkali metal salt or ammonium salt of an alkylbenzenesulfonic acid having 6 to 20 carbon atoms, an alkali metal salt or ammonium salt of alkyl sulfate having 6 to 20 carbon atoms, an alkali metal salt or ammonium salt of alkyldisulfonic acid diphenyloxide having 6 to 20 carbon atoms, or a mixture thereof may be used.

As the non-ionic emulsifier, alcohol having 6 to 20 carbon atoms, polyethylene oxide, polyoxyethylene alkylphenylether, polyoxyethylene alkylether, sorbitan monolaurate, polyvinyl alcohol, polyethylene glycol, or a mixture thereof may be used.

The emulsifier may be added in an amount of 0.005 parts by weight to 1.0 part by weight, or 0.01 part by weight to 0.5 parts by weight, or 0.01 part by weight to 0.1 part by weight, based on 100 parts by weight of the monomer mixture. When the emulsifier is used within the above range, it is possible to improve polymerization conversion of an ethylenically unsaturated monomer having higher water solubility than a vinyl chloride-based monomer and a hydroxyl-based monomer, and particle stability.

When a mixture of the anionic emulsifier and the non-ionic emulsifier is used, the anionic emulsifier and the non-ionic emulsifier may be mixed at a weight ratio of 1:1 to 1:100, or 10:1 to 1:10, or 20:1 to 1:5 within the above content range of the emulsifier.

When the anionic emulsifier and the non-ionic emulsifier are mixed within the weight ratio range, stability of the slurry may be ensured, the reaction conversion rate of the ethylenically unsaturated compound may be increased as much as possible, and the thermal transport from the surface of the polymerized vinyl chloride-based resin to the inside of the resin may be prevented as much as possible.

When the emulsifier is used as the additive and the water-soluble initiator is used as the initiator, the emulsifier and the water-soluble initiator may be mixed at a weight ratio of 1:10 to 10:1, or 1:20 to 20:1, or 1:1 to 20:1, or 2:1 to 15:1.

The emulsifier or the water-soluble initiator may be positioned on the surface of the polymerized vinyl chloride-based resin to block heat transfer to the inside of resin and to minimize denaturation of the resin. Specifically, the ethylenically unsaturated monomer has relatively high water solubility, as compared to the vinyl chloride, and thus the ethylenically unsaturated monomer is more easily distributed at the outside of a vinyl chloride droplet or aqueous phase than at the inside of the vinyl chloride droplet in the emulsion polymerization in which the aqueous dispersion medium is used. In this regard, it may capture the ethylenically unsaturated monomer distributed at the outside of the vinyl chloride droplet and the aqueous phase, inducing the same to participate in polymerization, thereby enhancing a reaction conversion rate of the compound. In addition, the water-soluble initiator may likewise enhance the reaction conversion rate of the ethylenically unsaturated monomer. Further, the emulsifier and the water-soluble initiator induces formation of particle morphology distributed on the surface of the polymerized vinyl chloride-based resin, thereby minimizing a change in a molecular structure by heat. Therefore, when the emulsifier and the water-soluble initiator are mixed within the above ratio, it is possible to obtain a latex, in which a reduction in adhesion due to the use of emulsifier may be minimized.

Meanwhile, the polymerization reaction may be performed using an apparatus 100 of FIGURE.

Specifically, the apparatus 100 of FIGURE may be a reactor 110 having a stirrer 111 and a magnetic drive 112, to which raw material feeding pumps 121 to 124 are connected.

Here, the raw material feeding pumps 121 to 124 are connected to containers (not shown) containing different raw materials through connection pipes, respectively. When a desired flow rate value is input to the feeding pump, a system capable of feeding the raw material corresponding to the flow rate value to the reactor 110 is provided.

Specifically, any one of the raw material feeding pumps (e.g., 121) may be connected to a container containing the acrylic monomer, another of the raw material feeding pumps (e.g., 122) may be connected to a container containing the vinyl chloride monomer, another of the raw material feeding pumps (e.g., 123) may be connected to a container containing the initiator, and the other of the raw material feeding pumps (e.g., 124) may be connected to a container containing the emulsifier.

Each of the raw material feeding pumps 121 to 124 may be connected to the upper portion of the reactor 110 through a connection pipe, and a valve may be positioned in the middle of each connection pipe to control feeding of the raw material.

For example, after feeding a solid emulsifier and other additives to the reactor 110, oxygen remaining in the reactor 110 may be removed using a vacuum pump (not shown).

Then, a part of the vinyl chloride monomer to be reacted is fed to the reactor 110 using the raw material feeding pump (e.g., 122), and the reactor is heated until the internal temperature of the reactor reaches the reaction temperature. Then, the initiator may be fed to the reactor 110 at a constant rate using the raw material tank 123.

The continuous feeding of the initiator may be maintained at a constant rate until polymerization is completed. In addition, after the initiator is fed, stirring may be started using the stirrer 111, and stirring may be performed at a constant speed until polymerization is completed. Specifically, the stirring may be performed at 100 rpm to 300 rpm. During this process, the magnetic drive 112 serves to rotate the stirrer 111.

After a predetermined period of time from the starting point of the feeding of the initiator, the total amount of the acrylic monomer to be reacted is continuously fed to the reactor 110 using the raw material tank 121. During this process, the feeding amount of the acrylic monomer may be decreased by two steps.

Also, at the same time as initiating the feeding of the acrylic monomer, feeding of the remainder of the vinyl chloride monomer to be reacted to the reactor 110 is started using the raw material tank 122. The additional feeding amount of the vinyl chloride monomer may be increased by continuous three steps.

Meanwhile, after a predetermined period of time from the starting point of the additional feeding of the vinyl chloride monomer, additional feeding of the emulsifier is continuously performed from the raw material feeding pump 124 to the reactor 110. During this process, the additional feeding amount of the emulsifier may be increased by two steps.

However, when the internal pressure of the reactor after completing the feeding of the emulsifier decreases by 2 kg/cm$^2$ to 4 kg/cm$^2$ as compared to the highest pressure during continuous feeding of vinyl chloride monomer, the continuous feeding of the initiator may be terminated.

Finally, after recovering unreacted vinyl chloride monomers remaining in the gas phase in the reactor, the polymer latex may be collected by opening the bottom valve of the reactor.

However, the method of using the apparatus 100 of FIGURE is only an example, and any apparatus generally used for the semi-continuous reaction in the art may be used to implement the present invention without particular limitation.

Vinyl Chloride-Acrylic Copolymer Latex

In another embodiment of the present invention, provided is a vinyl chloride-acrylic copolymer latex prepared by the preparation method of the above-described one embodiment, the vinyl chloride-acrylic copolymer latex including an aqueous dispersion medium; and vinyl chloride-acrylic copolymer particles dispersed in the aqueous dispersion medium.

The vinyl chloride-acrylic copolymer latex may include copolymer particles having a volume mean diameter D[4,3] of 0.150 μm to 0.165 μm, and a particle size distribution of 1.900 to 2.300. This means that the vinyl chloride-acrylic copolymer latex includes particles having a small size and a narrow size distribution, as compared with a vinyl chloride-vinyl acetate copolymer latex prepared by a batch reaction.

Here, the volume mean diameter D[4,3] of the particles and the particle size distribution thereof may be obtained using a commercially available laser diffraction particle size analyzer. Specifically, when the vinyl chloride-acrylic copolymer latex is introduced into a laser diffraction particle size analyzer (e.g., Mastersizer, etc.), and a laser beam is irradiated to pass through the latex, a diffraction pattern difference may occur according to the size of the copolymer particles in the latex.

The laser diffraction particle size analyzer analyzes the difference in the diffraction patterns generated in the device, calculates the mean diameter of spheres having the same surface area as the actual copolymer particles, and designates it as the D[4,3] value, and also analyzes the particle size distribution.

On the other hand, uniformity of the particle composition may be indirectly determined from a glass transition temperature. The vinyl chloride-acrylic copolymer latex prepared by the semi-continuous mode according to the above-described embodiment may have one (1 point) glass transition temperature, whereas the vinyl chloride-acrylic copolymer latex prepared by the batch mode may have two (2 points) glass transition temperatures.

Specifically, the vinyl chloride-acrylic copolymer latex prepared by the semi-continuous mode according to the above-described embodiment may have a glass transition temperature of 10° C. to 30° C.

The vinyl chloride-acrylic copolymer latex may have a weight average molecular weight of 250,000 g/mole to 350,000 g/mole, which is the increased range, as compared with the vinyl chloride-acrylic copolymer latex prepared by the batch mode.

As described, copolymer particles with a high degree of polymerization and a high molecular weight may contribute to improving mechanical strength, when applied to products such as inks, paints, coatings, adhesives, etc. to form a coating film.

In addition, in one embodiment, the aqueous dispersion medium is used, and thus it is possible to apply, to water-based products, the final product in the latex state as it is without a separate treatment.

The range of the water-based products is not particularly limited as long as they are living and industrial materials including inks, paints, coatings, adhesives, etc.

The particle size and size distribution, glass transition temperature, and weight average molecular weight of the vinyl chloride-acrylic copolymer latex may be controlled as desired within each range by controlling the feeding conditions of the raw materials according to the above-described preparation method of one embodiment.

The method of controlling the feeding conditions of the raw materials is the same as those described above in detail, and further description will be omitted.

The vinyl chloride-acrylic copolymer latex may be prepared as a resin composition by further adding a plasticizer; and a resin selected from ethylene vinyl acetate, polyethylene, polypropylene, polyvinyl chloride, polystyrene, polyurethane, polybutadiene, silicone, thermoplastic elastomers, and copolymers thereof.

The plasticizer may be a plasticizer generally known in the art. For example, a plasticizer including a phthalate or terephthalate compound may be used, and the phthalate or terephthalate compound may be hydrogenated to be used as the plasticizer.

The resin composition may be applied to various products. For example, the resin composition may be applied to products such as stabilizers, paints, inks, liquid foaming agents (Masterbatch types), adhesives, etc. In addition, the resin composition may be applied to the production of food packaging films (e.g., wrap), industrial films, compounds, decor sheets, decor tiles, soft sheets, hard sheets, wires and cables, wallpaper, foam mat, synthetic leathers, flooring, tarpaulin, gloves, sealant, gaskets of refrigerator, etc., hoses, medical devices, geogrid, mesh tarpaulin, toy products, stationery, insulation tapes, clothing coatings, PVC labels used for clothing or stationery, bottle cap liners, industrial or other stoppers, artificial baits, components in electronic devices (e.g., sleeve), automotive interior materials, adhesives, coatings, etc., but is not limited thereto.

Hereinafter, the actions and effects of the present invention will be described in more detail with reference to the specific exemplary embodiments of the present invention. However, these exemplary embodiments are only for illustrating the present invention, and the scope of the present invention is not limited thereto.

Example 1 (Semi-Continuous System)

(1) A part of vinyl chloride monomer to be reacted was fed to a 5 L-capacity autoclave reactor having a stirrer to prepare a reaction. In this process, a part of an emulsifier was also fed.

In detail, 1340 g of distilled water, 1.6 g of sodium metabisulfite as a reducing agent, 0.58 g of sodium lauryl sulfate as an emulsifier, 0.7 g of glyceryl monostearate, 1.47 g of sodium bicarbonate as a buffering agent, and 7 g of 0.001% copper sulfate as a co-catalyst were fed, and oxygen remaining in the reactor was removed using a vacuum pump.

Then, a part of the vinyl chloride monomer to be reacted was fed, and the initiator was continuously fed to initiate a polymerization reaction.

In detail, the total amount of the vinyl chloride monomer to be reacted was 1392 g, of which 20% by weight (278 g) was fed to the reactor, and the reactor was heated until the internal temperature of the reactor reached 70° C.

(2) After the internal temperature of the reactor reached 70° C., the polymerization reaction was initiated by continuously feeding the initiator at a flow rate of 1.49 ml/min. The initiator was a 0.055% potassium persulfate solution, in which a solvent of this solution was distilled water, and the content (%) is based on the content of the solute with respect to the total weight of the solution (100% by weight).

(3) After a predetermined period of time from the starting point of the feeding of the initiator, 2-ethylhexyl acrylate which is an acrylic monomer was continuously fed at a gradually decreasing flow rate by two steps.

During this process, while continuously feeding the initiator, additional feeding of the vinyl chloride monomer and the emulsifier was also continuously performed.

More specifically, after 40 minutes to 50 minutes from the starting point of the feeding of the initiator, the total amount (348 g) of the 2-ethylhexyl acrylate monomer was continuously fed. In this regard, from the starting point of the feeding of the 2-ethylhexyl acrylate monomer to 70 minutes, it was continuously fed at a flow rate of 3.37 ml/min (step 1), and from the ending point of the feeding of the step 1 to 70 minutes, it was continuously fed at a flow rate of 2.25 ml/min (step 2).

Further, the continuous additional feeding of the vinyl chloride monomer (80% of the total amount to be reacted, 1114 g) was initiated at the same time as initiating the feeding of the 2-ethylhexyl acrylate monomer. In this regard, from the starting point of the additional feeding of the vinyl chloride monomer to 20 minutes, it was continuously fed at a flow rate of 3.47 ml/min (step 1), from the ending point of the feeding of the step 1 to 120 minutes, it was continuously fed at a flow rate of 6.25 ml/min (step 2), and from the ending point of the feeding of the step 2 to 60 minutes, it was continuously fed at a flow rate of 8.13 ml/min (step 3).

On the other hand, after 10 minutes to 20 minutes from the starting point of the feeding of the remainder of the 2-ethylhexyl acrylate monomer, continuous additional feeding of the emulsifier was initiated. In this regard, from the starting point of the additional feeding of the emulsifier to 95 minutes, it was continuously fed at a flow rate of 0.86 ml/min (step 1), and from the ending point of the feeding of the step 1 to 140 minutes, it was continuously fed at a flow rate of 1.28 ml/min (step 2). Here, the emulsifier was a 4% sodium lauryl sulfate solution, in which a solvent of this solution was distilled water, and the content (%) is based on the content of the solute with respect to the total weight of the solution (100% by weight).

When the internal pressure of the reactor after completing the additional feeding of the emulsifier decreased by 2 kg/cm$^2$ to 4 kg/cm$^2$ as compared to the highest pressure during continuous feeding of the monomers, the feeding of the initiator was terminated.

Finally, after recovering unreacted vinyl chloride monomers remaining in the gas phase in the reactor, the polymer latex was collected by opening the bottom valve of the reactor.

Example 2

In the same manner as (1) and (2) of Example 1, a part of the vinyl chloride monomer to be reacted was fed to the reactor, and the initiator was continuously fed in the presence of the emulsifier to initiate a polymerization reaction.

On the other hand, different from (3) of Example 1, each feeding rate of the raw materials (i.e., acrylic monomer, vinyl chloride monomer, and emulsifier) additionally fed after the initiation of the reaction was controlled. In this regard, the time point of feeding each of the raw materials to be additionally fed after the initiation of the reaction was the same as in Example 1 above.

Specifically, after 40 minutes to 50 minutes from the starting point of the polymerization reaction, the total amount (348 g) of the 2-ethylhexyl acrylate monomer was continuously fed. In this regard, from the starting point of the feeding of the 2-ethylhexyl acrylate monomer to 100 minutes, it was continuously fed at a flow rate of 2.36 ml/min (step 1), and from the ending point of the feeding of the step 1 to 40 minutes, it was continuously fed at a flow rate of 3.93 ml/min (step 2).

Further, the continuous additional feeding of the vinyl chloride monomer (80% of the total amount to be reacted, 1114 g) was initiated at the same time as initiating the feeding of the 2-ethylhexyl acrylate monomer. In this regard, from the starting point of the additional feeding of the vinyl chloride monomer to 20 minutes, it was continuously fed at a flow rate of 3.47 ml/min (step 1), from the ending point of the feeding of the step 1 to 120 minutes, it was continuously fed at a flow rate of 6.25 ml/min (step 2), and from the ending point of the feeding of the step 2 to 60 minutes, it was continuously fed at a flow rate of 8.13 ml/min (step 3).

On the other hand, after 10 minutes to 20 minutes from the starting point of the feeding of the 2-ethylhexyl acrylate monomer, continuous additional feeding of the emulsifier was initiated. In this regard, from the starting point of the additional feeding thereof to 95 minutes, it was continuously fed at a flow rate of 0.86 ml/min (step 1), and from the ending point of the feeding of the step 1 to 140 minutes, it was continuously fed at a flow rate of 1.28 ml/min (step 2).

Others were performed in the same manner as in Example 1. Specifically, when the internal pressure of the reactor after completing the feeding of the emulsifier decreased by 2 kg/cm² to 4 kg/cm² as compared to the highest pressure during continuous feeding of the vinyl chloride monomer, the feeding of the initiator was terminated. Finally, after recovering unreacted vinyl chloride monomers remaining in the gas phase in the reactor, the polymer latex was collected by opening the bottom valve of the reactor.

Example 3

In the same manner as (1) and (2) of Example 1, a part of the vinyl chloride monomer to be reacted was fed to the reactor, and the initiator was continuously fed in the presence of the emulsifier to initiate a polymerization reaction.

On the other hand, at a time point different from (3) of Example 1, continuous feeding of the acrylic monomer, and continuous additional feeding of the remainder of the vinyl chloride monomer and the emulsifier were initiated. In this regard, the feeding rate of each material was the same as in Example 1.

Specifically, after 10 minutes to 20 minutes from the starting point of the polymerization reaction, the total amount (348 g) of the 2-ethylhexyl acrylate monomer was continuously fed. In this regard, from the starting point of the feeding of the 2-ethylhexyl acrylate monomer to 70 minutes, it was continuously fed at a flow rate of 3.37 ml/min (step 1), and from the ending point of the feeding of the step 1 to 70 minutes, it was continuously fed at a flow rate of 2.25 ml/min (step 2).

Further, the continuous additional feeding of the vinyl chloride monomer (80% of the total amount to be reacted, 1114 g) was initiated at the same time as initiating the feeding of the 2-ethylhexyl acrylate monomer. In this regard, from the starting point of the additional feeding of the vinyl chloride monomer to 20 minutes, it was continuously fed at a flow rate of 3.47 ml/min (step 1), from the ending point of the feeding of the step 1 to 120 minutes, it was continuously fed at a flow rate of 6.25 ml/min (step 2), and from the ending point of the feeding of the step 2 to 60 minutes, it was continuously fed at a flow rate of 8.13 ml/min (step 3).

On the other hand, after 10 minutes to 20 minutes from the starting point of the feeding of the 2-ethylhexyl acrylate monomer, continuous additional feeding of the emulsifier was initiated. In this regard, from the starting point of the additional feeding thereof to 95 minutes, it was continuously fed at a flow rate of 0.86 ml/min (step 1), and from the ending point of the feeding of the step 1 to 140 minutes, it was continuously fed at a flow rate of 1.28 ml/min (step 2).

Others were performed in the same manner as in Example 1. Specifically, when the internal pressure of the reactor after completing the feeding of the emulsifier decreased by 2 kg/cm² to 4 kg/cm² as compared to the highest pressure during continuous feeding of the vinyl chloride monomer, the feeding of the initiator was terminated. Finally, after recovering unreacted vinyl chloride monomers remaining in the gas phase in the reactor, the polymer latex was collected by opening the bottom valve of the reactor.

Comparative Example 1 (Batch System)

(1) The total amount of the acrylic monomer was fed to a 5 L-capacity autoclave reactor having a stirrer in the presence of an emulsifier and an initiator to initiate a reaction.

In detail, 348 g of 2-ethylhexyl acrylate monomer, 1290 g of distilled water, 1.41 g of sodium metabisulfite (100% solid phase) as a reducing agent, 0.17 g of potassium persulfate (100% solid phase) as an initiator, 11.37 g of sodium lauryl sulfate (100% solid phase) as an emulsifier, and 0.62 g of glyceryl monostearate, 1.3 g of sodium bicarbonate as a buffering agent, and 6 g of 0.001% copper sulfate as a co-catalyst were fed, and oxygen remaining in the reactor was removed using a vacuum pump.

(2) Thereafter, the total amount (1,392 g) of the vinyl chloride monomer to be reacted was fed in a batch mode. Heating was started, and the reaction was allowed while maintaining the polymerization temperature at 70° C. During this process, additional feeding of the initiator and the emulsifier was not performed.

When the internal pressure of the reactor decreased by 2 kg/cm² to 4 kg/cm² as compared to the highest pressure reached after the feeding of the vinyl chloride monomer, unreacted vinyl chloride monomers remaining in the gas phase in the reactor were recovered, and the polymer latex was collected by opening the bottom valve of the reactor.

Comparative Example 2

(1) A part of the acrylic monomer to be reacted and the total amount of the vinyl chloride monomer and the emulsifier were fed to a 5 L-capacity autoclave reactor having a stirrer to prepare a reaction.

In detail, 2-ethylhexyl acrylate was used as the acrylic monomer in the same manner as in Examples, and 70 g corresponding to 20% of the total amount of 348 g to be reacted was taken and fed to the reactor.

Further, 1340 g of distilled water, 1.6 g of sodium metabisulfite as a reducing agent, 11.02 g of sodium lauryl sulfate (100% solid phase) as an emulsifier, and 0.7 g of glyceryl monostearate, 1.47 g of sodium bicarbonate as a buffering agent, and 7 g of 0.001% copper sulfate as a co-catalyst were fed, and oxygen remaining in the reactor was removed using a vacuum pump.

Thereafter, the total amount (1392 g) of the vinyl chloride monomer to be reacted was fed, and the reactor was heated until the internal temperature thereof reached 70° C.

(2) After the internal temperature of the reactor reached 70° C., a 0.055% aqueous potassium persulfate solution as an initiator was continuously fed at a flow rate of 1.49 ml/min to initiate the polymerization reaction.

(3) After a predetermined period of time from the starting point of the feeding of the initiator, continuous additional feeding of the 2-ethylhexyl acrylate monomer to be reacted was performed.

Specifically, after 40 minutes to 50 minutes from the starting point of the feeding of the initiator, continuous additional feeding of the 2-ethylhexyl acrylate monomer (about 80% of the total amount, 278 g) to be reacted was started, and for 140 minutes from the starting point of the additional feeding thereof, its feeding rate was maintained constant at 2.32 ml/min.

During this process, no additional feeding of the emulsifier was performed while continuously feeding the initiator at a flow rate of 1.49 ml/min.

After completing the additional feeding of the 2-ethylhexyl acrylate monomer, when the internal pressure of the reactor decreased by 2 kg/cm² to 4 kg/cm² as compared to the highest pressure during the reaction, the feeding of the initiator was terminated. Thereafter, unreacted vinyl chloride monomers remaining in the gas phase in the reactor were recovered, and the polymer latex was collected by opening the bottom valve of the reactor.

Experimental Example

Each of the latexes prepared in Examples and Comparative Examples was evaluated by the following methods, and the evaluation results are recorded in Table 1.

Particle size D[4,3] and Particles size distribution: Each latex was diluted with distilled water at a concentration of 10% to 20%, and introduced into a laser diffraction particle size analyzer (manufacturer: Malvern Panalytical, device name: Mastersizer 3000). When a laser beam was irradiated to pass through the latex, a difference in the diffraction patterns occurred according to the particle size. The volume mean diameter D[4,3] of the copolymer particles in the latex was obtained therefrom, and the particle size distribution was obtained.

Glass transition temperature: Each of the latexes was dried to obtain a powder thereof while changing the temperature from 0° C. to 140° C. using a differential scanning calorimeter (DSC, device name: DSC 2920, manufacturer: TA instrument), and the energy graph of each powder was obtained, and the temperature at the inflection point shown in the graph was used as a glass transition temperature.

Weight average molecular weight: Each latex was dried and pulverized to obtain a powder, and each powder was dissolved in tetrahydrofuran (THF), and a weight average molecular weight was obtained at room temperature using gel permeation chromatography (GPC).

purpose is achieved. Thus, it is difficult to control the heat of polymerization generated during the reaction and the reaction rate.

In contrast, in Example 1, the semi-continuous mode was used, in which only a part of the raw materials is fed and reacted, and additional feeding of the raw materials is continuously performed during the reaction. Thus, it is possible to obtain a latex including vinyl chloride-acrylic particles having a relatively high degree of polymerization and a high molecular weight and a uniform particle composition by suppressing generation of excessively high heat of reaction and controlling the reaction rate within an appropriate range.

However, even though the semi-continuous mode is adopted, it is necessary to consider the reactivities of different monomers.

Specifically, the acrylic monomer is known to have higher reactivity and higher reaction rate than the vinyl chloride monomer.

Accordingly, as in Comparative Example 2, when the reaction is started while feeding the total amount of the emulsifier, the total amount of the vinyl chloride monomer, and a part of the acrylic monomer, the acrylic monomers having a relatively high reaction rate are first reacted with each other.

However, in Comparative Example 2, when the reaction between the acrylic monomers had progressed to some degree, the acrylic monomers were additionally fed before the vinyl chloride monomer participated in the reaction, and thus a block copolymer having a low degree of randomness was obtained.

TABLE 1

|  |  | Example 1 | Example 2 | Example 3 | Comparative Example 1 | Comparative Example 2 |
|---|---|---|---|---|---|---|
| Preparation method | Polymerization method | Emulsion polymerization | Emulsion polymerization | Emulsion polymerization | Emulsion polymerization | Emulsion polymerization |
|  | Reactor operation mode (monomer feeding mode) | Semi-continuous | Semi-continuous | Semi-continuous | Batch | Semi-continuous |
| Evaluation of prepared latex | Particle size | 0.158 μm | 0.162 μm | 0.155 μm | 0.170 μm | 0.171μm |
|  | Particle size distribution | 1.975 | 1.865 | 2.055 | 2.887 | 2.679 |
|  | Glass transition temperature | 20° C. | 24° C. | 19.7° C. | −65° C. and 80° C. | −0.5° C. and 74° C. |
|  | Molecular weight | 297,355 g/mole | 273,476 g/mole | 291,678 g/mole | 200,020 g/mole | 210,148 g/mole |

Referring to Table 1, the latex of Example 1 was confirmed to include the vinyl chloride-acrylic copolymer particles with a high degree of polymerization and high molecular weight and a uniform particle composition, as compared to the latex of Comparative Example 1.

For reference, uniformity of the particle composition may be indirectly determined from the glass transition temperature. The uniform latex of Example 1 has one (1 point) glass transition temperature, whereas the latex of Comparative Example 1 with a non-uniform particle composition has two (2 points) glass transition temperatures.

The difference in physical properties of the latex of Example 1 and the latex of Comparative Example 1 is due to the difference in the reactor operation mode. In the polymerization reaction using vinyl chloride monomers, as the reaction temperature increases, a polymer with a low degree of polymerization and a low molecular weight tends to be prepared.

In Comparative Example 1, the batch mode was used, in which raw materials (here, monomers, initiator, and emulsifier) are added once, and the reaction is continued until the Accordingly, in Comparative Example 2, although the semi-continuous mode was used, a latex having physical properties comparable to those of the batch mode was obtained, because the reactivities of the monomers were not considered.

In contrast, in Example 1, a part of the emulsifier and part of the vinyl chloride monomer were fed, and the initiator was fed to initiate the reaction between the vinyl chloride monomers.

In this state, the acrylic monomer was fed and additional feeding of the vinyl chloride monomer and the emulsifier was performed, respectively. As a result, random polymerization occurred between the acrylic monomer and the vinyl chloride monomer fed after initiation of the reaction of the vinyl chloride monomer.

In Example 1, particularly, the surface properties of the vinyl chloride-acrylic copolymer particles were controlled by varying the feeding rate of the raw materials to be fed after the initiation of the reaction.

In detail, as the feeding rate of the 2-ethylhexyl acrylate monomer to be fed after the initiation of the reaction was gradually decreased, and each feeding rate of the vinyl chloride monomer and the emulsifier to be additionally fed was gradually increased, relatively more vinyl chloride-based repeating units may be distributed on the surface of the vinyl chloride-acrylic copolymer particles.

Accordingly, it is possible to effectively control the heat of reaction during the reaction, to reduce fouling inside the reactor after the reaction, and to contribute to increasing the production continuity.

Meanwhile, within the scope of the embodiment described above, it is also possible to make the feeding rate of the raw materials additionally fed after the initiation of the reaction different from that of Example 1, or to make the feeding time of the raw materials different from that of Example 1.

Specifically, the former corresponds to Example 2, and the latter corresponds to Example 3, all of which obtained latexes at the same level as in Example 1 in terms of the size D[4,3], particle size distribution, glass transition temperature, molecular weight of the vinyl chloride-acrylic copolymer particles, etc.

In this regard, within the scope of one embodiment described above, it will be possible to control the rate of the additional feeding or the time of additional feeding of each material, and to control the distribution, glass transition temperature, molecular weight of the final product, etc.

DESCRIPTION OF SYMBOLS

100: Polymerization apparatus
111: Stirrer
112: Magnetic drive
121 to 124: Raw material feeding pumps

What is claimed is:

1. A method of preparing a vinyl chloride-acrylic copolymer latex, the method comprising the steps of:
    preparing a polymerization reaction by feeding an aqueous dispersion medium, an emulsifier, and a vinyl chloride monomer to a reactor;
    initiating the polymerization reaction by continuously feeding an initiator to the prepared reactor; and
    continuously feeding an acrylic monomer to the reactor, in which the polymerization reaction is initiated,
    wherein in the step of continuously feeding the acrylic monomer to the reactor, in which the polymerization reaction is initiated, an additional feeding of vinyl chloride monomer and an additional feeding of emulsifier are also continuously performed, respectively, and
    wherein when the feeding of the acrylic monomer is performed, the feeding amount thereof per hour is decreased.

2. The method of claim 1, wherein a weight ratio of the vinyl chloride monomer and the acrylic monomer to be reacted is 70:30 to 90:10 (the total amount of vinyl chloride monomer: the total amount of acrylic monomer).

3. The method of claim 1, wherein 10% by weight to 30% by weight of the total amount (100% by weight) of the vinyl chloride monomer to be reacted is fed in a batch mode in the preparing step before initiation of the polymerization reaction, and the remaining additional feeding of vinyl chloride monomer is continuously performed while increasing the feeding amount per hour after initiation of the polymerization reaction.

4. The method of claim 1, wherein the step of preparing the polymerization reaction is to increase the temperature until the internal temperature reaches 40° C. to 80° C. in a state in which the aqueous dispersion medium, the emulsifier, and the vinyl chloride monomer are fed to the reactor.

5. The method of claim 1, wherein in the step of continuously feeding the acrylic monomer to the reactor, in which the polymerization reaction is initiated, the additional feeding of the vinyl chloride monomer is initiated at the same time as initiating the feeding of the acrylic monomer.

6. The method of claim 5, wherein the additional feeding of the vinyl chloride monomer is initiated at the same time as initiating the additional feeding of the acrylic monomer at a time point of ⅛ or more and ⅙ or less of the total polymerization reaction time.

7. The method of claim 5, wherein the additional feeding of the emulsifier is initiated at a time point of 1/7 or more and ⅕ or less of the total polymerization reaction time.

8. The method of claim 1, wherein a first feeding of the acrylic monomer is performed while controlling the feeding amount per hour to 3 ml to 4 ml from the starting point of the feeding of the acrylic monomer to a time point of ⅛ or more and ⅖ or less of the total polymerization reaction time, and
    a second feeding of the acrylic monomer is performed while controlling the feeding amount per hour to 2 ml to 3 ml from the end point of the first feeding to a time point of ⅖ or more and ⅗ or less of the total polymerization reaction time.

9. The method of claim 1, wherein when the additional feeding of the vinyl chloride monomer and the emulsifier is performed, the feeding amounts thereof per hour are each independently increased.

10. The method of claim 9, wherein when the additional feeding of the vinyl chloride monomer is performed,
    a first additional feeding is performed while controlling the feeding amount per hour to 3 ml to 4 ml from the starting point of the additional feeding of the vinyl chloride monomer to a time point of ⅛ or more and ⅖ or less of the total polymerization reaction time,
    a second additional feeding is performed while controlling the feeding amount per hour to 6 ml to 7 ml from the end point of the first additional feeding to a time point of ⅖ or more and ⅗ or less of the total polymerization reaction time, and
    a third additional feeding is performed while controlling the feeding amount per hour to 8 ml to 9 ml from the end point of the second additional feeding to a time point of ⅗ or more and ⅘ or less of the total polymerization reaction time.

11. The method of claim 9, wherein when the additional feeding of the emulsifier is performed,
    a first additional feeding is performed while controlling the feeding amount per hour to 0.6 ml to 1.1 ml from the starting point of the additional feeding of the emulsifier to a time point of 1/7 or more and ½ or less of the total polymerization reaction time, and
    a second feeding is performed while controlling the feeding amount per hour to 1 ml to 1.5 ml from the end point of the first additional feeding to a time point of ½ or more and 9/10 or less of the total polymerization reaction time.

12. The method of claim 1, wherein the initiator is continuously fed while maintaining the feeding amount per hour constant from the starting point of the polymerization reaction to the end point of the polymerization reaction.

13. The method of claim 12, wherein the feeding amount of the initiator per hour is maintained constant within the range of 1 ml to 2 ml.

14. The method of claim 1, wherein the end point of the polymerization reaction is a point at which the internal pressure of the reactor is lowered by 2 kgf/cm$^2$ to 4 kgf/cm$^2$, as compared to the highest pressure of the reactor reached after the start of the reaction.

\* \* \* \* \*